(12) United States Patent
Arzate-Engels

(10) Patent No.: US 8,678,325 B2
(45) Date of Patent: Mar. 25, 2014

(54) PIPE BRACKET FOR VEHICLE

(75) Inventor: Miguel Arzate-Engels, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 13/025,001

(22) Filed: Feb. 10, 2011

(65) Prior Publication Data

US 2012/0205501 A1 Aug. 16, 2012

(51) Int. Cl.
*F16L 3/22* (2006.01)
(52) U.S. Cl.
USPC .............................. 248/68.1; 248/74.2; 248/71
(58) Field of Classification Search
USPC ................. 248/65, 67.7, 68.1, 74.1–74.2, 49,
248/57–58, 62, 71, 73, 342–343; 296/204,
296/208, 193.07; 24/458, 297, 581.11;
174/58; 62/239; 180/68.1
See application file for complete search history.

(56) References Cited

U.S. PATENT DOCUMENTS

| | | | |
|---|---|---|---|
| 3,494,657 A * | 2/1970 | Harper et al. ................. | 296/208 |
| 4,148,113 A | 4/1979 | Dvorachek | |
| 4,403,377 A * | 9/1983 | Mizusawa ....................... | 24/681 |
| 4,550,891 A | 11/1985 | Schaty | |
| 4,591,119 A | 5/1986 | Kraus | |
| 4,669,156 A | 6/1987 | Guido et al. | |
| 4,705,244 A * | 11/1987 | Saotome et al. ............. | 248/68.1 |
| 4,905,942 A * | 3/1990 | Moretti ........................ | 248/68.1 |
| 4,936,530 A | 6/1990 | Wollar | |
| 5,002,244 A * | 3/1991 | Holbury et al. .............. | 248/68.1 |
| 5,076,518 A * | 12/1991 | Washizu et al. ............. | 248/68.1 |
| 5,102,187 A * | 4/1992 | Harasaki ....................... | 296/204 |
| 5,133,523 A | 7/1992 | Daigle et al. | |
| 5,195,607 A * | 3/1993 | Shimada et al. ............. | 180/296 |
| 5,547,152 A | 8/1996 | Krock | |
| 6,070,836 A * | 6/2000 | Battie et al. .................. | 248/68.1 |
| 6,382,710 B1 * | 5/2002 | Funk et al. ............... | 296/187.12 |
| 7,600,724 B2 * | 10/2009 | Nelson et al. ................ | 248/68.1 |
| 2001/0047897 A1 * | 12/2001 | Steenackers et al. ........ | 180/89.2 |
| 2005/0045775 A1 * | 3/2005 | Kato ............................ | 248/68.1 |
| 2007/0045034 A1 * | 3/2007 | Kim ............................. | 180/379 |
| 2010/0078966 A1 * | 4/2010 | Onoda et al. ............. | 296/193.07 |

OTHER PUBLICATIONS

The Plastic Spork Blog, Delrin vs Acetal: Homopolymer vs Copolymer, Aug. 13, 2007.*

* cited by examiner

*Primary Examiner* — Terrell McKinnon
*Assistant Examiner* — Ingrid M Weinhold
(74) *Attorney, Agent, or Firm* — Rankin, Hill & Clark LLP

(57) ABSTRACT

A bracket for carrying pipes on an underside of a vehicle includes a molded body laterally spanning a recess in the underside of the vehicle. The molded body can have an angled forward face for deflecting underside road debris. The bracket can additionally include an integrally molded carrying structure extended upward from the molded body for carrying one or more longitudinally extending pipes within the recess.

14 Claims, 7 Drawing Sheets

PIPE BRACKET FOR VEHICLE

BACKGROUND

The present disclosure generally relates to a bracket for carrying conduits, pipes, lines, etc. on an underside of a vehicle, and more particularly relates to an HVAC pipe bracket for securing HVAC lines within an underside recess on a vehicle.

Modern vehicles employ numerous brackets of various types for securing tubes, pipes, wires, etc. in position on the vehicle. Some brackets only secure against lateral motion; other brackets secure to limit axial and rotational motion. The particular configuration of the bracket employed often corresponds to the one or more pipes or other items carried and the mounting location on the vehicle. Several tubes, pipes, wires, etc. are often carried on the underside of the vehicle. These can be secured at one or more locations to the underside of the vehicle by one or more brackets. Conventionally such brackets have been formed of metal, which provides strength and durability to the bracket.

Some modern vehicles employ various HVAC components in the rear of the vehicle. For example, some HVAC systems include components disposed at the front of the vehicle for heating and cooling a front zone of the vehicle and additional components disposed at the rear of the vehicle for heating and cooling a rear zone of the vehicle. It is sometimes necessary to provide lines (e.g., pipes, conduits, etc.) that extend from the components disposed at the front of the vehicle to the components disposed at the rear of the vehicle. It is often most convenient to run these lines along an underside of the vehicle. Such routing can necessitate the need for one or more brackets to secure the lines to the underside of the vehicle.

Such brackets may be subject to impact from road debris that may be kicked-up toward the underside of the vehicle during operation thereof. For example, when the vehicle is driven on a relatively rough road, there may be an increased likelihood of various road debris (e.g., rocks, stones, etc.) being thrown toward the underside of the vehicle and potentially at any bracket securing lines, such as HVAC lines, to the underside of the vehicle.

SUMMARY

According to one aspect, a bracket for carrying pipes on an underside of a vehicle includes a molded body laterally spanning a recess in the underside of the vehicle. The molded body can have an angled forward face for deflecting underside road debris. The bracket can additionally include an integrally molded carrying structure extended upward from the molded body for carrying one or more longitudinally extending pipes within the recess.

According to another aspect, an HVAC pipe bracket for securing HVAC pipes within an underside tunnel recess on a vehicle includes a body extending across the tunnel recess and a carrying structure integrally formed by the body. The molded body has an upper surface facing the tunnel recess, a lower, opposite surface spaced apart from the upper surface, and a forward face interposed between the upper and lower surfaces and forwardly facing on the vehicle. The forward face can be angled for deflecting debris from the body. The carrying structure extends upwardly from the upper surface of the body into the tunnel recess. The carrying structure has sleeve portions for complementarily receiving the HVAC pipes.

According to a further aspect, a resin molded bracket for carrying pipes on an underside of a vehicle includes a molded body having an angled forward face and an integrally molded carrying structure. The integrally molded carrying structure extends from the body for carrying at least one longitudinally extending pipe along the underside of the vehicle.

DETAILED DESCRIPTION

Figure 1:
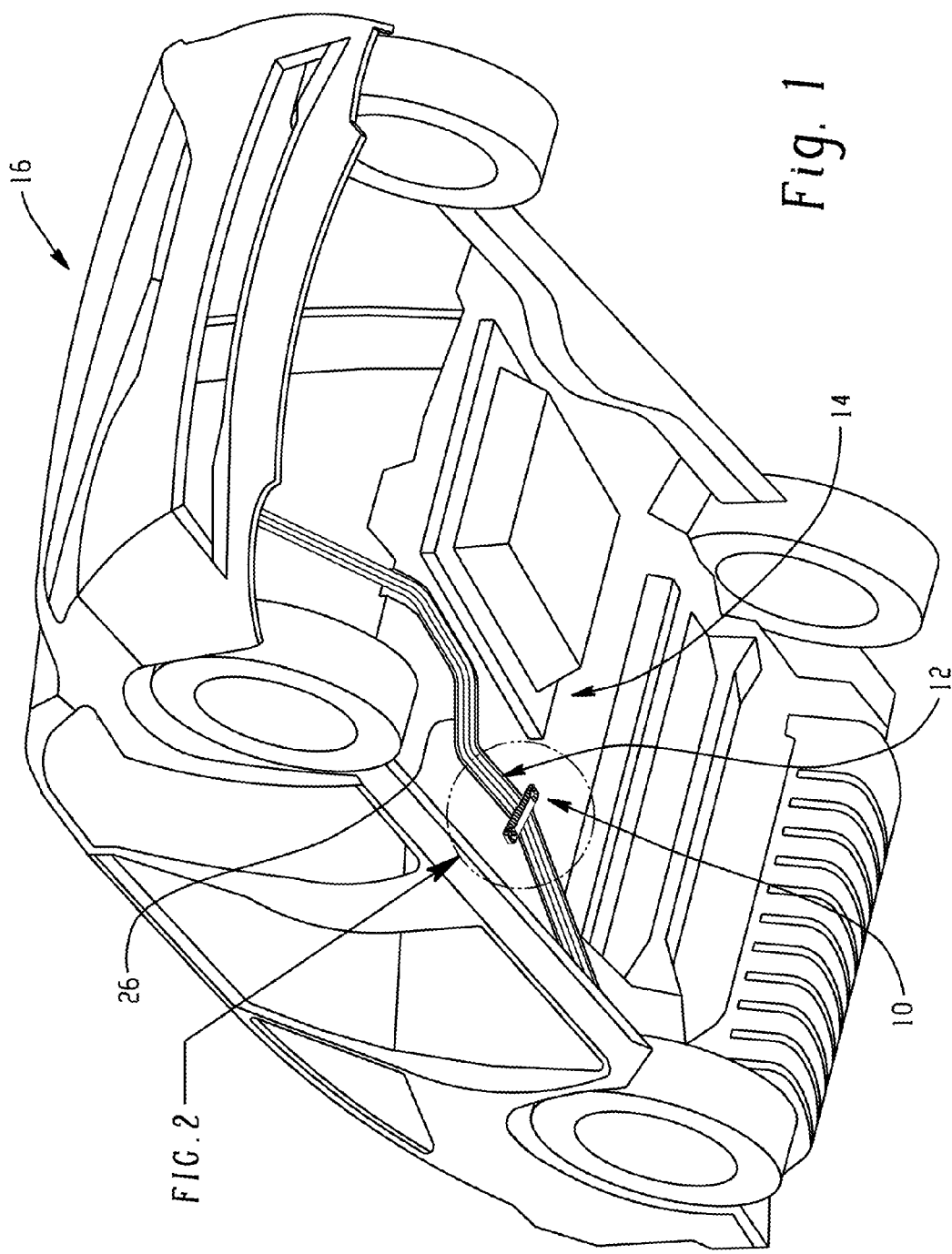
FIG. 1 is a perspective view of a vehicle showing a bracket mounted to an underside of the vehicle for carrying pipes therealong.
Figure 2:
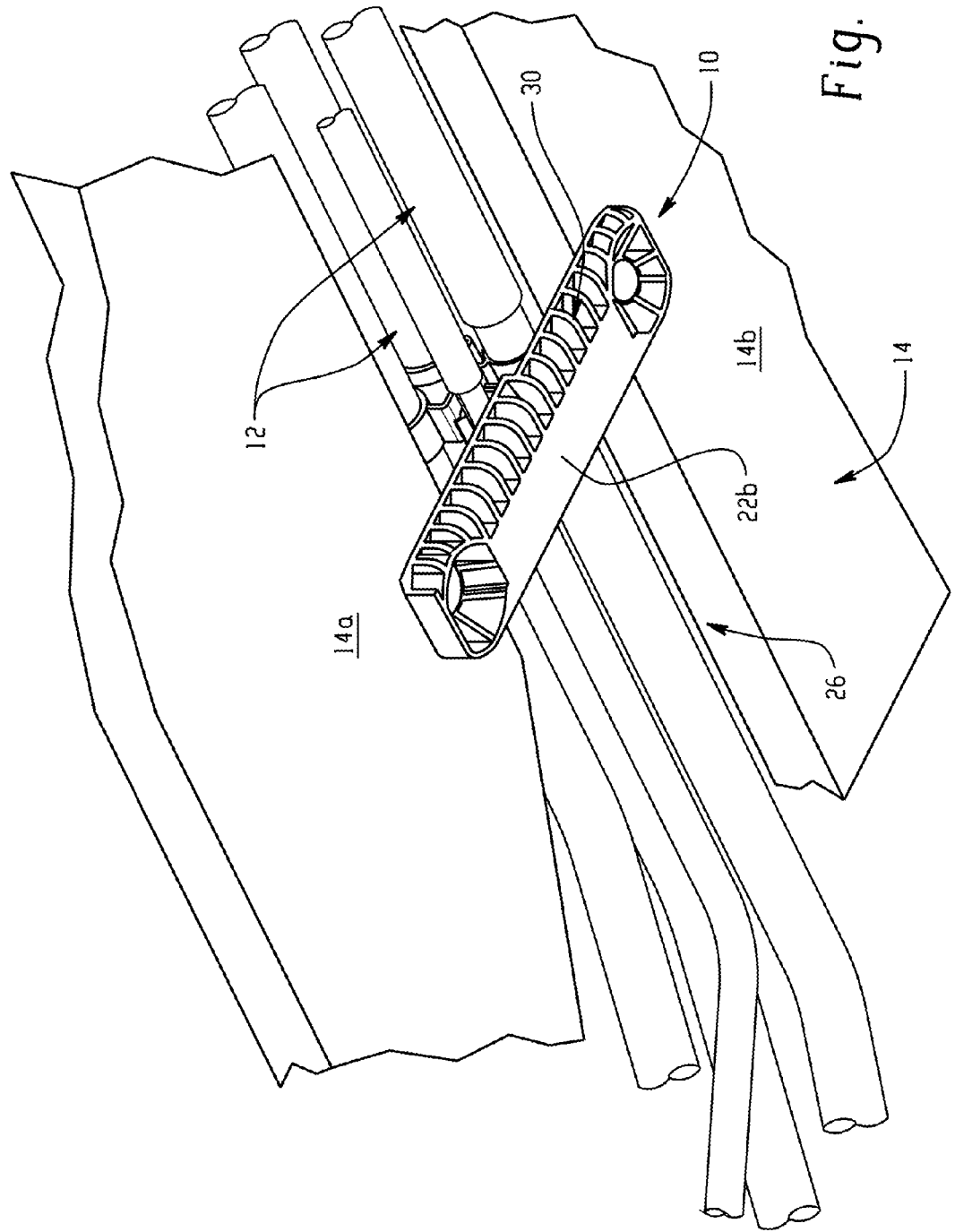
FIG. 2 is an enlarged perspective view showing the bracket mounted to the underside of the vehicle and carrying the pipes therealong.
Figure 3:
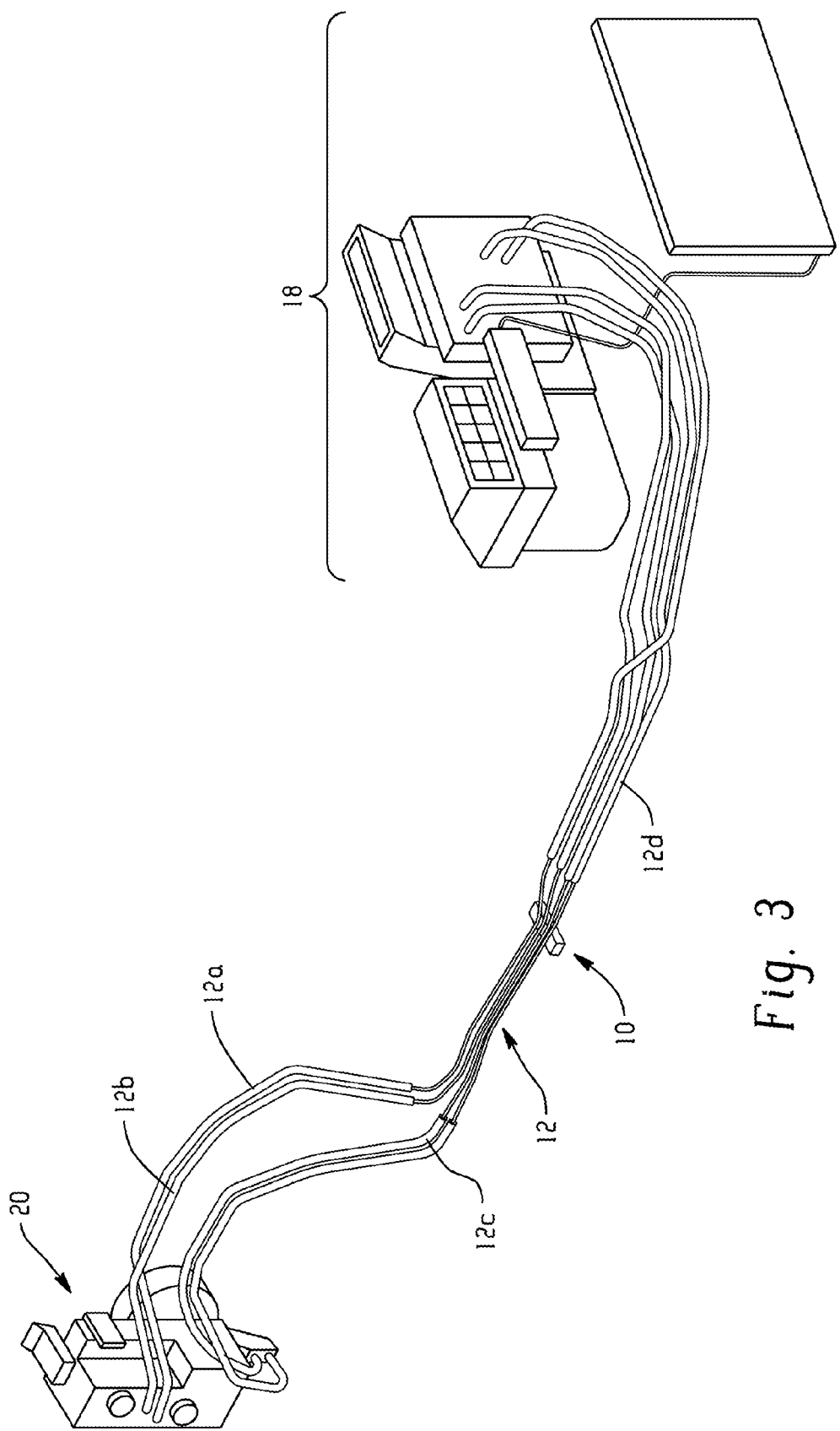
FIG. 3 is a perspective view showing the pipes and the bracket removed from the vehicle with the pipes connected to forward and rearward HVAC components.

Referring now to the drawings, wherein the showings are for purposes of illustrating one or more exemplary embodiments and not for purposes of limiting same, FIGS. 1 and 2 illustrate a bracket 10 for carrying pipes 12 on an underside 14 of a vehicle 16. The pipes 12 can be any one or more pipes, conduits, lines, etc. running along the underside 14 of the vehicle 16. In the illustrated embodiment, the pipes 12 are HVAC pipes extending between front or forward HVAC components 18 (FIG. 3), which are disposed at a forward end of the vehicle 16, and rear HVAC components 20 (FIG. 3), which are disposed at a rearward end of the vehicle 16. As is known and understood skilled in the art, the HVAC components 18, 20 can be used for heating and cooling both a front zone (e.g., front passenger seat area) and a rear zone (e.g., rear of the front passenger seats) of the vehicle 16. While the bracket 10 is shown and described in connection with HVAC pipes 12, it is to be appreciated that the bracket 10 could be used with other pipes, conduits, lines, etc. on the vehicle 16 (e.g., fuel lines, brake lines, etc.).

As used herein, HVAC components can include any vehicle component associated with or used for HVAC functions on the vehicle. This can include, for example, HVAC blowers, heater elements for heating vented air, evaporators for cooling vented air, A/C compressors, engine cooling lines and components (e.g., the vehicle's radiator, etc.). With additional reference to FIG. 3, the pipes 12 extending between the forward HVAC components 18 and the rear HVAC components 20 of the illustrated embodiment include a rear heat pipe 12a, a rear heat return pipe 12b, a rear cooling pipe 12c and a rear cooling return pipe 12d. In one embodiment, the rear heat pipe 12a supplies hot engine coolant (i.e., coolant heated by the engine during cooling thereof) to the rear HVAC components 20 for heating a rear zone on the vehicle and the rear heat return pipe 12b returns the coolant after heating the rear zone to the front HVAC components 18 (e.g., to further cool the vehicle's engine). The rear cooling pipe 12c supplies cold refrigerant to the rear HVAC components 20 for cooling the rear zone and the rear cooling return pipe 12d returns the refrigerant to the front HVAC components (e.g., to be condensed for further vehicle cooling). As will be described in further detail below, the bracket 10 carries the pipes 12a-d along the underside 14 of the vehicle 16.

With further reference to FIGS. 4-7, the bracket 10 includes a molded body 22 and a carrying structure 24 integrally formed with the molded body. The carrying structure 24 can be integrally molded with the molded body 22 and, as shown, it extends upward from the molded body 22 for carrying one or more longitudinally extending pipes, such as the pipes 12, along the underside 14 of the vehicle 16. In the illustrated embodiment, the underside 14 of the vehicle 16 includes an underside tunnel recess 26 defined therein. The molded body 22 can laterally span the recess 26 in the underside 14 of the vehicle 16. More particularly, in the illustrated embodiment, the body 22 can extend across the tunnel recess 26 and the carrying structure 24 can carry the pipes 12 within the recess 26.

The carrying structure 24 of the illustrated embodiment carries the plurality of the pipes 12, including the pipes 12a-d as described hereinabove. In this illustrated embodiment, the bracket can be referred to as an HVAC pipe bracket that secures the HVAC pipes 12a-d within the underside tunnel recess 26 on the vehicle 16; however, it is to be appreciated by those skilled in the art that the carrying structure 24 can carry any number of pipes (e.g., a single pipe, two pipes, three pipes or five or more pipes) and/or the pipes can alternatively be other lines or conduits (e.g., fuel lines, windshield washer fluid lines, etc.).

As will be described in more detail below, the molded body 22 can have an angled forward face 30 for deflecting underside road debris (e.g., rocks, stones, etc.) from the body 22. The forward face 30 of the body 22 is the face forwardly disposed on the vehicle 16. That is, the forward face 30 faces in a forward direction on the vehicle 16. Advantageously, the angled forward face 30 can deflect road debris and increase the useful life of the bracket 10. In particular, the angled face 30 on the bracket 10 can protect the bracket 10, such as when the vehicle 16 traverses a rough road with loose road debris. More specifically, the angled forward face 30 prevents or at least reduces the likelihood of road debris from striking the bracket 10 in a direction normal or orthogonal to the forward face. If striking in a direction normal or orthogonal to the forward face, the load of the road debris strike would potentially be more fully absorbed by the bracket 10 and this could potentially decrease useful life of the bracket. Having the forward face 30 angled reduces the likelihood of road debris striking the forward face orthogonally relative to the face. As a result, the useful life of the bracket 10 can be extended. Moreover, this structural change can enable the bracket 10 to be formed of less costly and/or weighty materials (e.g., the bracket 10 can be formed of a resin as will be described in more detail below).

Figure 6:
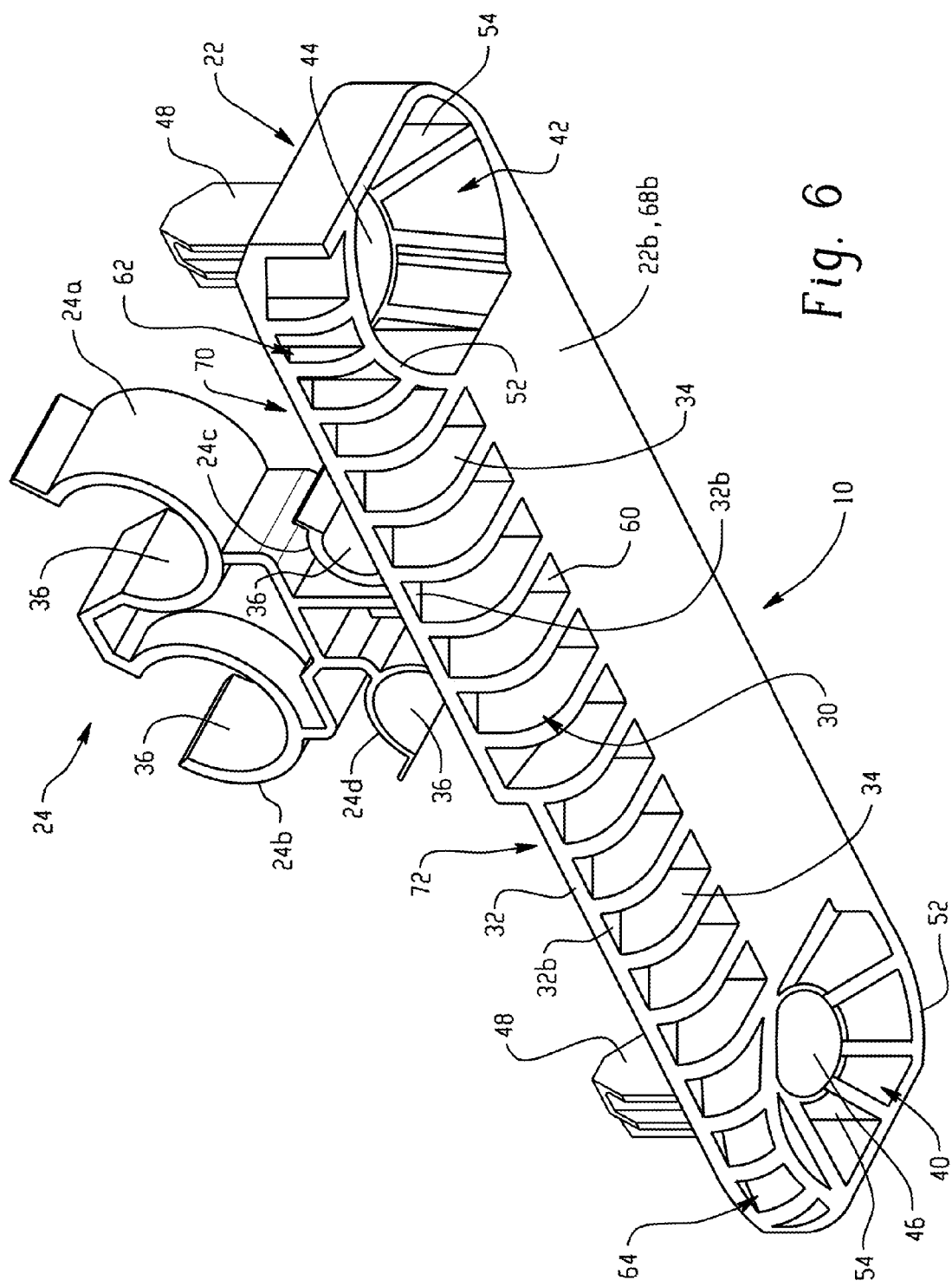
FIG. 6 is front side perspective view of the bracket shown with the pipes removed.

More specifically, in the illustrated embodiment, the molded body 22 has an upper surface 22a facing the recess 26, a lower, opposite surface 22b spaced apart from the upper surface 22a with the forward face 30 angled outwardly and upwardly from the lower surface toward the upper surface, as shown in FIG. 6, interposed between the upper and lower surfaces 22a, 22b and forwardly facing on the vehicle 16. The body 22 can include a main plate portion 32 having an upper side 32a that can be the upper side 22a of the body 22. A plurality of spaced apart ribs or rib walls 34 depend downwardly from a lower side or underside 32b of the main plate portion 32. As will be described in more detail below, forward ends of the ribs or rib walls 34 can form the angled forward face 30. Lower sides of the ribs 34 can at least partially form the lower surface 22b of the body 22.

Figure 4:
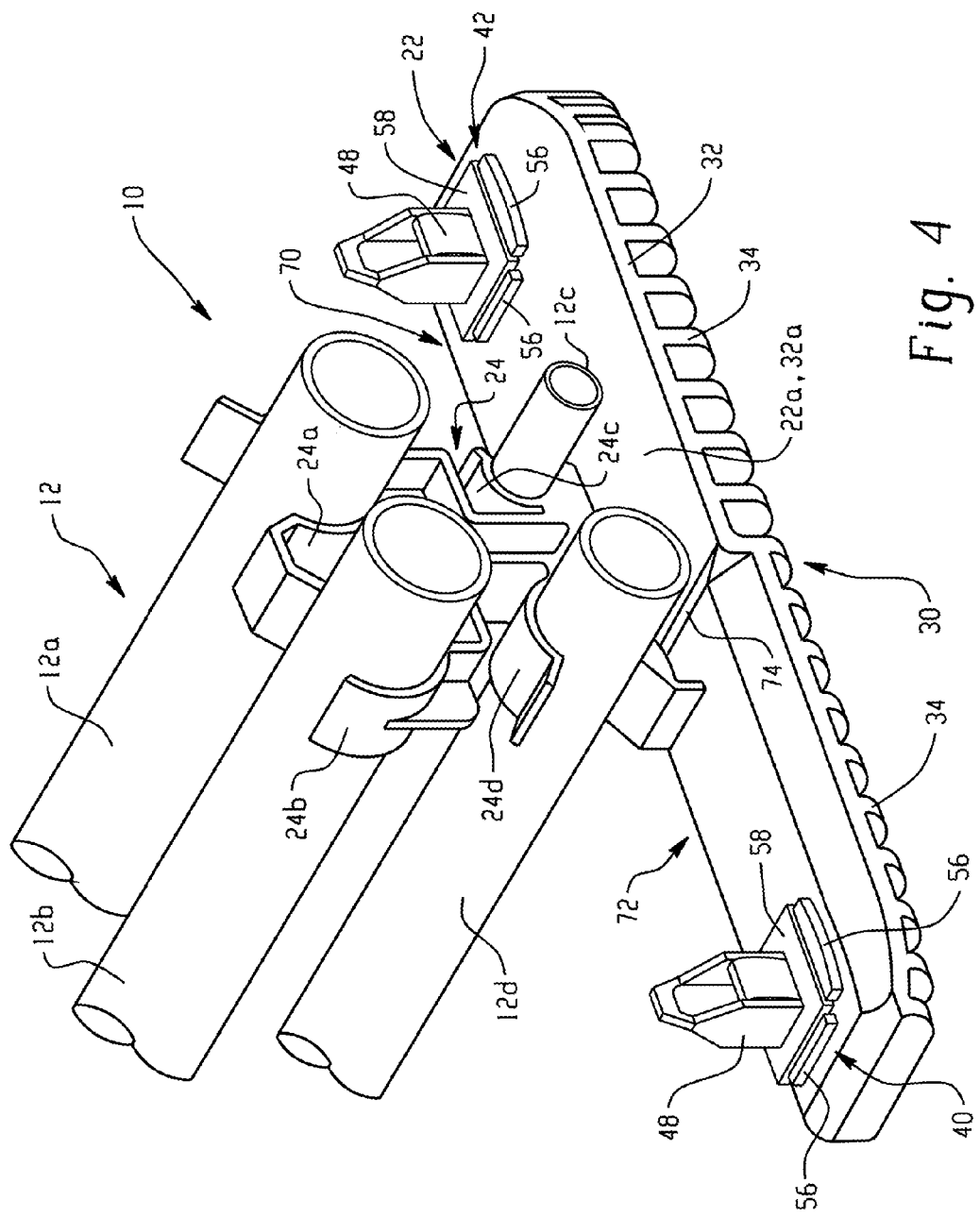
FIG. 4 is a front side perspective view of the bracket showing the bracket carrying the pipes.
Figure 5:
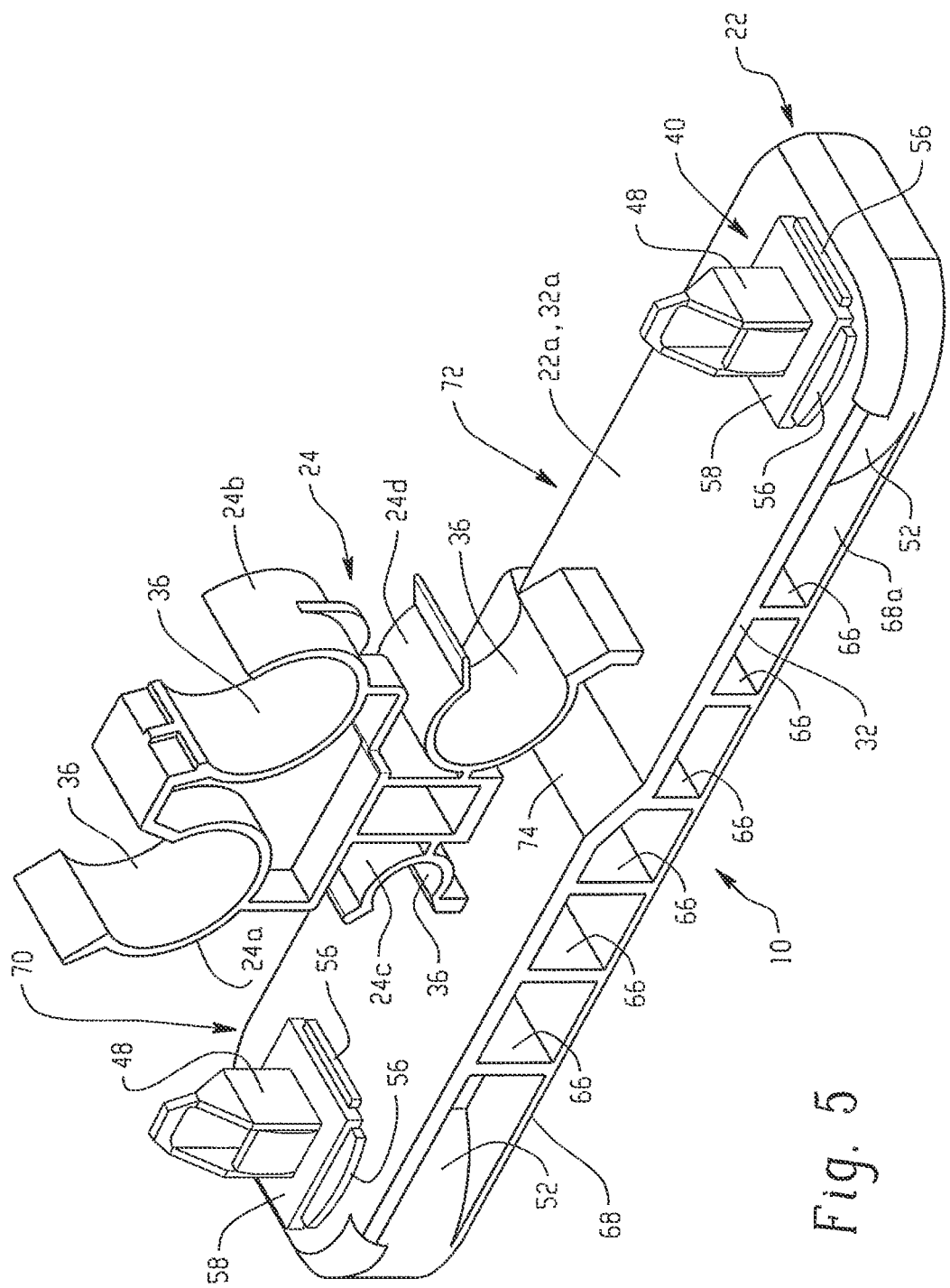
FIG. 5 is a rear side perspective view of the bracket shown with the pipes removed.

As shown, the carrying structure 24 can extend from the upper surface 32a of the main plate portion 32. When mounted to the underside 14 of the vehicle 16, the carrying structure 24 extends upwardly from the upper surface 22a of the body 22 into the tunnel recess 26. The carrying structure 24 can have sleeve portions 24a, 24b, 24c, 24d for complementarily receiving the pipes 12a-12d, respectively (FIG. 4). In one embodiment, the carrying structure 24 includes at least two sleeve portions (e.g., sleeve portions 24a-24d) for carrying at least two longitudinally extending pipes (e.g., 12a-12d). In the illustrated embodiment, the carrying structure 24 includes four sleeve portions 24a-d for carrying four longitudinally extending pipes 12a-d. In any case, each sleeve portion can have a contact surface 36 for complementarily engaging an outside surface of the corresponding pipes 12a-d and can have a circumferential dimension sufficient to provide clipping engagement with the pipes 12a-d (e.g., the circumferential dimension leaves a gap slightly smaller than a diameter of the pipe).

In the illustrated embodiment, the bracket 10 includes clip structures 40, 42 disposed at opposite lateral ends of the molded body 22 for attaching the molded body 22 to the underside 14 of the vehicle 16. The clip structures 40, 42 can be used in association with a pair of fastener clips (not shown) for securing the body 22, and more generally the bracket 10, to the underside 14 of the vehicle 16 defining the tunnel recess 26. As shown, each of the clip structures 40, 42 includes an integrally molded clip housing 48 extending upward from the molded body 22, and particularly upward from the upper side 22a of the molded body 22. Each clip housing 48 is receivable in a corresponding aperture (not shown) defined in the underside 14 of the vehicle 16 and has or defines a clip housing aperture 44, 46 for receiving a respective one of the fastener clips.

Each of the clip structures 40, 42 can additionally include an annular wall 52 depending downwardly from the underside 32b of the main plate portion 32. The annular wall 52 can be angularly spaced from the clip housing aperture. In the illustrated embodiment, the annular wall 52 includes straight portions oriented orthogonally relative to the forward face 30 and curved portions spanning across the bracket in a direction generally parallel to the forward face 30. As shown, a plurality of radial ribs 54 can extend from the annular wall 52 to the clip housing aperture. Raised positioning members 56 can extend upward from the upper surface 32a of the main plate portion for defining an area around each clip housing 48 for receipt of a sealer 58. To connect the bracket 10 to the underside 14 of the vehicle 16, the clip housings 48 of the bracket 10 are received in respective apertures defined in the underside 14 of the vehicle 16 on opposite sides 14a, 14b of the tunnel recess 26. The sealer 58 can be applied to assist in preventing water from entering into/behind the underside portions 14a, 14b of the vehicle 16.

In the illustrated embodiment, a center wall 60 (FIG. 6) depends downwardly from the underside 32b of the main plate portion 32 and laterally extends from annular wall 52 of clip structure 40 to the annular wall 52 of clip structures 42. The ribs 34 similarly depend downwardly from the underside 32b of the main plate portion 32 and also extend forward from the center wall 60 as shown. Additional sets of ribs 62, 64 can flank the ribs 34. In particular, the additional sets of ribs 62, 64 extend forward from respective annular walls 52 of the clip structures 40, 42 in parallel alignment with the ribs 34. All of the ribs 34, 62, 64 can be laterally spaced apart (e.g., as shown) and together can form the angled forward face 30 on the bracket 10.

The bracket 10 of the illustrated embodiment includes the ribs 34 as a forward set of ribs and further includes ribs 66 as a rearward set of ribs with the laterally extending wall 60 separating the forward set of ribs 34 and the rearward set of ribs 66. The bracket 10, and more specifically the body 22, can include a lower plate portion 68 disposed over the rearward set of ribs 66 in spaced relation relative to the main plate portion 32. In particular, the ribs 34 can extend upward from an upper surface 68a of the lower plate portion 68 and a lower surface 68b of the lower plate portion 68 can be the underside surface 22b of the body 22. In the illustrated embodiment, the ribs 34 of the forward set of ribs are more closely spaced apart than the ribs 66 of the rearward set of ribs, though this is not required.

Also in the illustrated embodiment, the main plate portion 32 includes a first lateral portion 70 and a second lateral portion 72 connected to one another by a tapered wall portion or surface 74. As shown, the first lateral portion 70 can be disposed at a first height for engaging the first underside portion 14a of the underside 14, which can be disposed at a first elevation on a first side of the recess 26. The second lateral portion 72 can be disposed at a second height for engaging the second underside portion 14b of the underside 14, which can be disposed at a second elevation on a second, opposite side of the recess 26. As shown, the first height of the first lateral portion can be different from the second height of the second lateral portion 72. This enables the bracket 10 to accommodate attachment to underside components or portions (e.g., portions 14a and 14b) of the vehicle 16 that are disposed at varying elevations.

Figure 7:
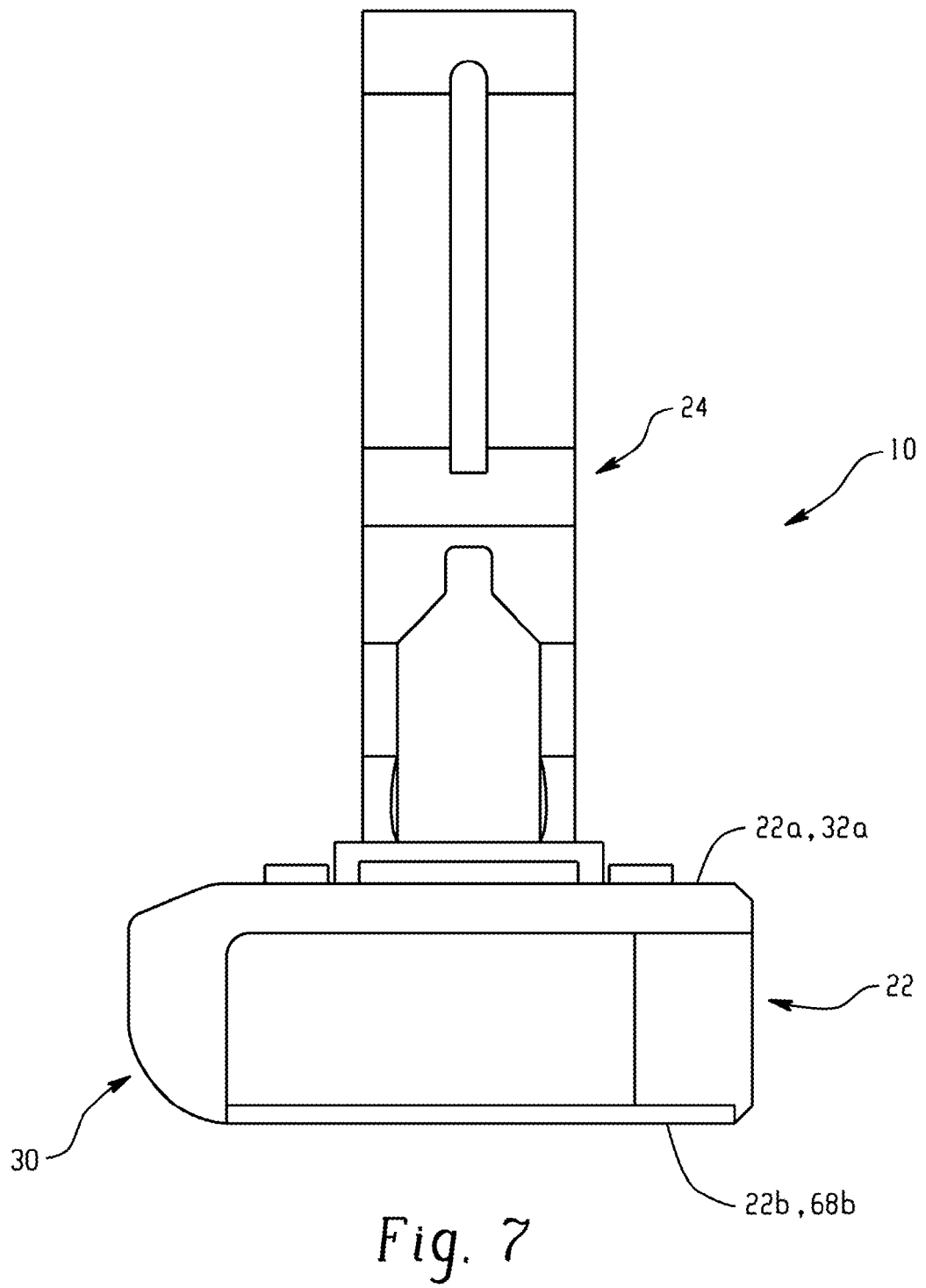
FIG. 7 is a side elevational view of the bracket showing the angled front face of the bracket.

With reference now to FIG. 7, a side elevation or profile of the bracket 10 is shown. This view illustrates the angled forward face 30 disposed on a forward side of the bracket 10, and particularly the body 22. As shown, a lower portion of the ribs 34, 62, 64 are angled to provide the angled profile to the face 30. In one embodiment, the angle is approximately 45 degrees, though this is not required. In the same or another embodiment, the forward ends of the ribs have a curved profile that provides the angled forward face. With the inclusion of the angled face 30, the bracket 10, including the molded body 22 and the carrying structure 24, can be formed of a resin material. One exemplary material from which the carrying structure 24 and the body 22 can be integrally molded is acetyl homopolymer. Of course, as will be appreciated by those skilled in the art, other materials can be used but advantageously the angled profile face 30 allows less expensive and/or lighter materials to be used. With the angled face 30, the bracket (e.g., when molded from a resin) can deliver the same durability of a metal bracket but can have a lower weight and be less costly to manufacture.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A bracket for carrying pipes on an underside of a vehicle, comprising:
   a molded body for laterally spanning a recess in the underside of the vehicle, said molded body having an upper surface for facing the recess, a lower, opposite surface spaced apart from the upper surface, and a forward surface interposed between the upper and lower surfaces, said forward surface having an angled forward face angled in a forward outwardly and upwardly from the lower surface toward the upper surface;
   an integrally molded carrying structure extending upward from said molded body for carrying one or more longitudinally extending pipes within said recess; and
   a main plate portion having an upper side from which said carrying structure extends and a lower side from which a plurality of laterally spaced apart ribs depend downwardly to a lower plate portion in spaced relation relative to said main plate portion, wherein forward ends of said ribs at least partially define said angled forward face; and
   wherein said main plate portion includes a first lateral portion disposed at a first height for engaging a first underside portion of the underside disposed at a first elevation on a first side of the recess and a second lateral portion disposed at a second height for engaging a second underside portion of the underside disposed at a second elevation on a second, opposite side of the recess, said first height different from said second height.

2. The bracket of claim 1 wherein said ribs include a forward set of ribs and a rearward set of ribs with a laterally extending wall separating said forward set of ribs and said rearward set of ribs, forward ends of said forward set of ribs at least partially defining said angled forward face.

3. The bracket of claim 2 wherein said lower plate portion is disposed over said rearward set of ribs.

4. The bracket of claim 2 wherein ribs of said forward set of ribs are more closely spaced apart than ribs of said rearward set of ribs.

5. The bracket of claim 1 further including clip structures disposed at opposite lateral ends of said molded body for attaching said molded body to the underside of the vehicle.

6. The bracket of claim 5 wherein each of said clip structures includes an integrally molded clip housing extending upward from said molded body, said clip housing having a clip housing aperture for receiving an associated fastener clip.

7. The bracket of claim 6 wherein each of said clip structures further includes an annular wall depending downward and annularly spaced from said clip housing aperture, and further includes a plurality of radial ribs extending from said annular wall to said clip housing aperture.

8. The bracket of claim 7 further including:
   a center wall depending downwardly and laterally extending from said annular wall of a first of said clip structures to said annular wall of a second of said clip structures;
   said plurality of ribs depending downwardly and extending forward from said center wall.

9. The bracket of claim 8 wherein said forward ends of said ribs have a curved profile.

10. The bracket of claim 9 further including additional ribs extending forward from said annular walls of said clip structures, ribs of said additional ribs and said ribs extending forward from said center wall being laterally spaced apart and together at least partially defining said angled forward face.

11. The bracket of claim 1 wherein said carrying structure includes at least two sleeve portions for carrying at least two longitudinally extending pipes, each sleeve portion having a contact surface for complementarily engaging an outside surface of said at least two longitudinally extending pipes and having a circumferential dimension sufficient to provide clipping engagement with said at least two longitudinally extending pipes.

12. The bracket of claim 1 wherein said molded body and said carrying structure are formed from a resin material.

13. A bracket for carrying pipes on an underside of a vehicle, comprising:

a molded body for laterally spanning a recess in the underside of the vehicle, said molded body having an upper surface for facing the recess, a lower, opposite surface spaced apart from the upper surface, and a forward surface interposed between the upper and lower surfaces, said forward surface having an angled forward face angled outwardly and upwardly from the lower surface toward the upper surface;

an integrally molded carrying structure extending upward from said molded body for carrying one or more longitudinally extending pipes within said recess;

a main plate portion having an upper side from which said carrying structure extends and a lower side from which a plurality of laterally spaced apart ribs depend downwardly to a lower plate portion in spaced relation relative to said main plate portion; and clip structures disposed at opposite lateral ends of said molded body for attaching said molded body to the underside of the vehicle, each of said clip structures including an integrally molded clip housing extending upward from said molded body, said clip housing having a clip housing aperture for receiving an associated fastener clip, each of said clip structures further including an annular wall depending downward and annularly spaced from said clip housing aperture, and further including a plurality of radial ribs extending from said annular wall to said clip housing aperture.

14. A bracket for carrying pipes on an underside of a vehicle, comprising:

a molded body for laterally spanning a recess in the underside of the vehicle, said molded body having an upper surface for facing the recess, a lower, opposite surface spaced apart from the upper surface, and a forward surface interposed between the upper and lower surfaces, said forward surface having an angled forward face angled outwardly and upwardly from the lower surface toward the upper surface;

an integrally molded carrying structure extending upward from said molded body for carrying one or more longitudinally extending pipes within said recess; and a main plate portion having an upper side from which said carrying structure extends and a lower side from which a plurality of laterally spaced apart ribs depend downwardly to a lower plate portion in spaced relation relative to said main plate portion, wherein forward ends of said ribs at least partially define said angled forward face;

wherein said ribs include a forward set of ribs and a rearward set of ribs with a laterally extending wall separating said forward set of ribs and said rearward set of ribs, forward ends of said forward set of ribs at least partially defining said angled forward face, and wherein ribs of said forward set of ribs are more closely spaced apart than ribs of said rearward set of ribs.

\* \* \* \* \*

UNITED STATES PATENT AND TRADEMARK OFFICE
CERTIFICATE OF CORRECTION

| | |
|---|---|
| PATENT NO. | : 8,678,325 B2 |
| APPLICATION NO. | : 13/025001 |
| DATED | : March 25, 2014 |
| INVENTOR(S) | : Miguel Arzate-Engels |

Page 1 of 1

It is certified that error appears in the above-identified patent and that said Letters Patent is hereby corrected as shown below:

In the Claims:

Column 6, line 1, "in a forward" should be deleted.

Signed and Sealed this
Seventeenth Day of June, 2014

Michelle K. Lee
*Deputy Director of the United States Patent and Trademark Office*